July 16, 1968        C. R. WALDROP        3,392,747
CONVENIENCE WATER OUTLET IN AN AUTOMATIC WASHER AND THE LIKE
Filed Aug. 27, 1965        2 Sheets-Sheet 1
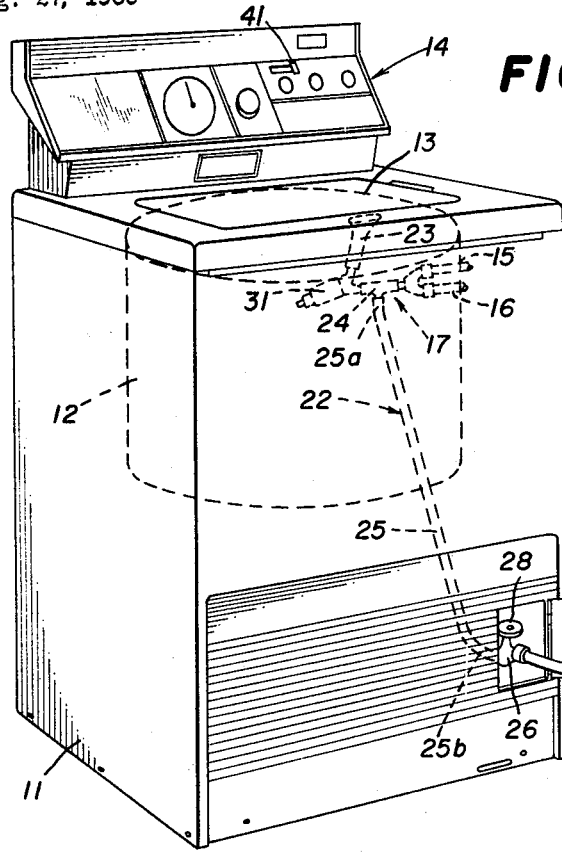
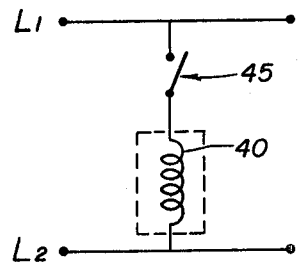
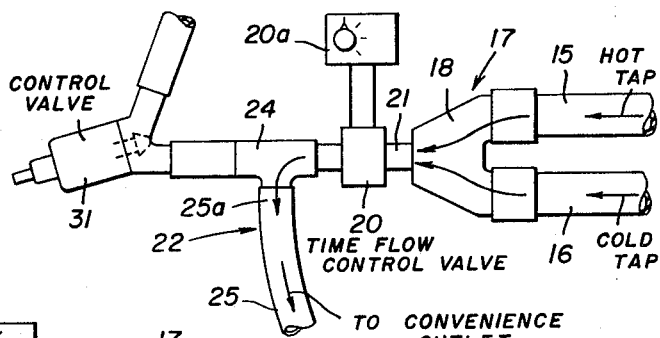
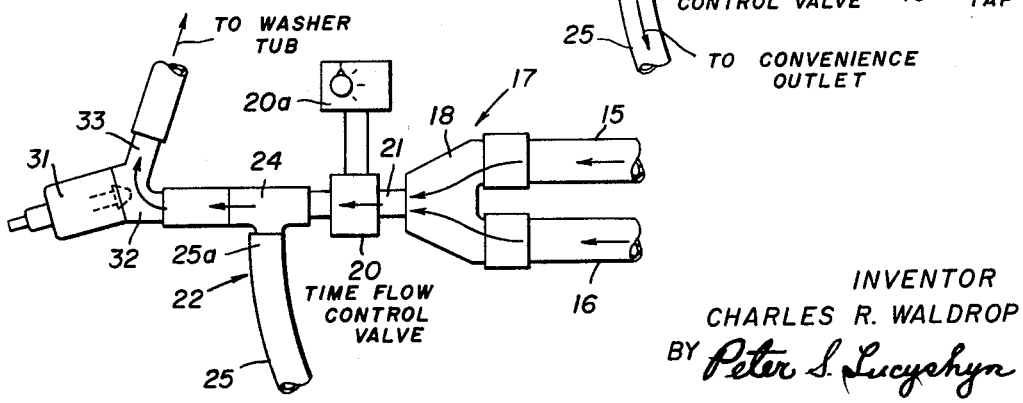
INVENTOR
CHARLES R. WALDROP
BY Peter S. Lucyshyn
ATTY.

July 16, 1968  C. R. WALDROP  3,392,747
CONVENIENCE WATER OUTLET IN AN AUTOMATIC WASHER AND THE LIKE
Filed Aug. 27, 1965  2 Sheets-Sheet 2

INVENTOR
CHARLES R. WALDROP
BY Peter S. Lucyshyn
ATTY.

United States Patent Office 3,392,747
Patented July 16, 1968

3,392,747
CONVENIENCE WATER OUTLET IN AN AUTOMATIC WASHER AND THE LIKE
Charles R. Waldrop, Herrin, Ill., assignor to Borg-Warner Corporation, Chicago, Ill., a corporation of Illinois
Filed Aug. 27, 1965, Ser. No. 483,271
3 Claims. (Cl. 137—374)

The present invention relates to appliances of the type commonly used in a household and more particularly to a convenience water system for such appliances.

Oftentimes, an automatic washer or the like is stored in a garage or basement. It is customarily connected to a water source, ordinarily both hot and cold water. The washer can be one of the standard types available, having either or both, means for mixing hot and cold water and means for time controlling flow of water. In a garage, for example, it is desirable to have warm water to wash a car in the winter. Also, for example, in watering lawns it is desirable to time the flow of water and provide automatic shut-off after a predetermined flow period.

Accordingly, it is an object of the present invention to provide a convenience water system for appliances of the type commonly used in households, for example automatic washers and the like, utilizing controls in the appliance to provide a source of water having a preselected temperature and/or having a pre-set time period of flow.

It is a further object of the present invention to provide a convenience water supply system which is easily adapted to the standard water systems ordinarily found in home appliances such as automatic washers and the like.

It is a more detailed object of the present invention to provide a convenience water system for a home appliance such as an automatic washer or the like which is adaptable to the main water system therein and which is concealable to maintain streamline appearance of the appliance and prevent injury to a housewife in the ordinary use of the appliance while being easily accessible for use to provide a water source of selected temperature or selected time period of flow.

It is an overall object of the present invention to provide an economically manufacturable and easily installable convenience water system particularly adapted for use with water systems of appliances such as washers and the like.

Other objects and advantages of the invention will become apparent upon reading the following detailed description and upon reference to the drawings in which:

FIGURE 1 is perspective of an automatic washer embodying the present invention;

FIGURE 2 is a plan view of a portion of a main water flow system in the washer with components operated to direct flow in a first direction;

FIGURE 3 is a plan view of the water flow system as shown in FIGURE 2 with the components therein operated to direct water flow in a second direction;

FIGURE 7 is a schematic of a control circuit for a control valve of the type shown in FIGURE 4.

Figure 6:
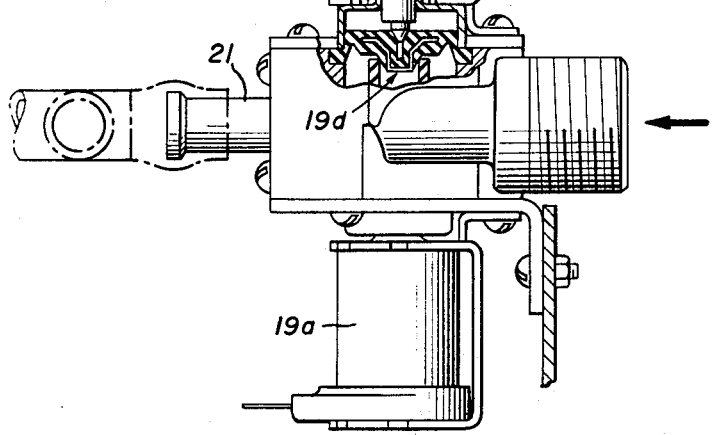
FIGURE 6 is an elevational view of the mixing valve of FIGURE 5.

Turning to the drawings, shown in FIGURE 1 is a perspective of a home appliance, in the present instance a washer 10, embodying the present invention. A cabinet 11 is provided for enclosing a water receiving receptacle, here shown as a tub 12, and carrying a hinged top lid 13 for permitting access to the tub. Mounted on top of the cabinet and to the rear is a backguard 14 housing the controls for the washer and having exposed dials and control elements. Relatively hot and cold water is fed by a pair of conduits 15, 16 from a suitable source, for example a household tap, into a main flow system 17 by way of a mixing valve 18. At the tap the cold water may have a temperature of about 55° F. and the hot water a temperature of about 150° F. As best shown in FIGURE 6, the illustrated mixing valve 18 has a pair of solenoid valves 19, 19a, respectively, for controlling flow from the respective hot and cold water carrying lines 15, 16. Control is effected by adjusting the valve openings to proportion flow from each of these lines so that a desired water temperature somewhere between the temperature of the hot and the cold water is obtained. The solenoids are responsive to an electrical signal to thereby operate an armature 19b which acts against the bias of spring 19c to open a valve 19d (only one exemplary valve is shown).

For controlling the time length of flow of water in the main flow systems 17, as herein illustrated, a time flow-control valve 20 is connected to an output conduit 21 of the mixer valve 18. The valve 20 may be of the commercially available type which is operated by an electrical solenoid receiving signals from a main control circuit programmed by a timer (not shown) or the timer may be a separately adjustable unit 20a. A valve which is usable is described subsequently in this specification. For a description of the structure of typical timers used in home appliances reference may be made to Hall U.S. Patent No. 2,313,064 and Constantine U.S. Patent No. 2,703,347. These timers can be incorporated into an appliance control circuit, one such control circuit utilizing time fill of a washer tub is described in a patent assigned to General Electric Company, Conlee U.S. Patent No. 2,841,003. During customary operation of the illustrated appliance, water necessary for the operation of the washer is fed into the tub 12 through a flume 23 forming a discharge opening for the main fluid flow system.

In accordance with the present invention an auxiliary system 22 is connected to the main water flow system 17 and is selectively operable to direct water from the main flow system to means, for example a hose 30, for permitting use of water outside of the appliance 10. As herein illustrated, the auxiliary flow system 22 is connected to the main flow system 17 at a T connection 24. The T connection is positioned in the main flow system downstream from both the mixer valve 18 and the time-length-of-flow control valve 20. The auxiliary flow system 22 includes a conduit 25 connected at its upper end 25a to receive water from the main flow system at the T connection 24, and to discharge water at its lower end 25b to an outlet 26. The outlet could be placed on the appliance at any conveniently accessible location; as herein illustrated it is suitably supported behind a lower, front portion of the washer cabinet 11. The outlet 26 in the preferred embodiment includes a manually operable valve member 28 to either permit flow of water from the outlet 26 or to shut off the flow of water therefrom. The cabinet is provided with a small hingedly supported door 27 at its lower front face for covering the outlet 26 and maintaining the streamlined appearance of the cabinet when the convenience outlet is not being used. One device which can be easily connected to the convenience outlet 26 is a hose 30. The latter, of course, can be used in washing a car or for carrying water to a lawn sprinkler.

Figure 4:
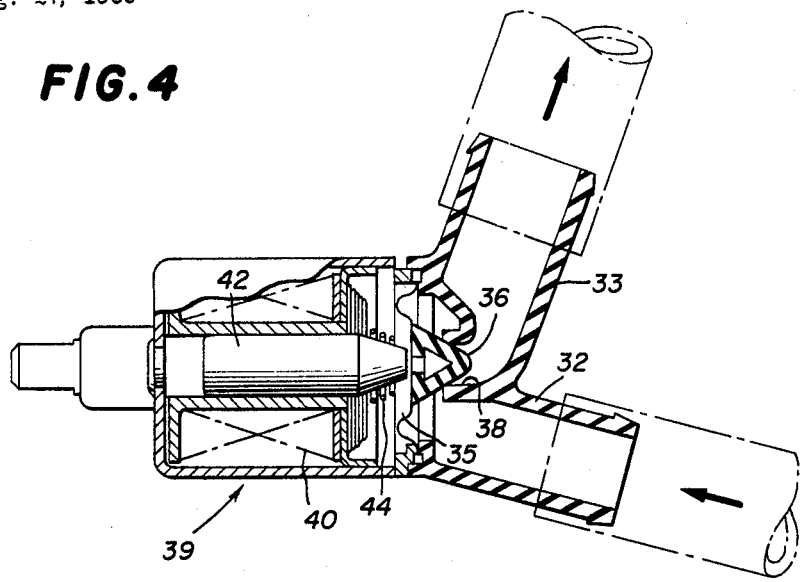
FIGURE 4 is an enlarged view, partially in section, of a control valve for selectively permitting or stopping water flow.
Figure 5:
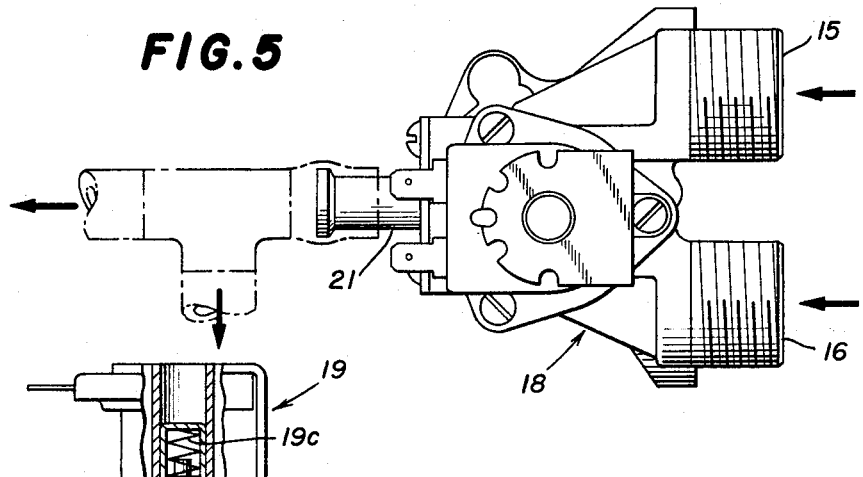
FIGURE 5 is a plan view of a liquid mixing valve of the type commonly used in appliances such as automatic washers.

For directing the flow of water from the main flow system 17 and preventing the discharge of water through the flume 23 so as to cause it to flow into the auxiliary system, a main flow system control valve 31 is provided. The latter is shown in detail in FIGURE 4, the illustrated type being commonly known in the art as a "pinch" valve. The latter includes respective conduit coupling members 32, 33, in the present instance conduit coupling portion 32 being an inlet and conduit coupling portion 33 being an outlet. A flexible diaphragm 35 carrying a conical shaped stopper 36 is operative between opened and closed positions for permitting fluid communication or preventing fluid communication between the respective conduit connecting portions 32, 33 by engagement or disengagement respectively with a port portion 38.

The stopper 36 is selectively operated by energizing a solenoid 39. The latter includes a coil 40 energizable from a suitable electrical source, shown in FIGURE 7 are a pair of lines L1, L2 representing such as source. The energization of the coil is controlled by a switch 41. Responsive to energization of the coil is an armature 42 connected with the stopper 36 so as to move the latter against the bias of a spring 44 thereby opening port 38.

The function of the time flow control valve 20 (details not shown) could be performed by the mixing valve 18. If so used, the energization of the solenoid coil 19 could be timer controlled by having switch 41 mechanically connected either to a timer of the aforementioned type or to a separate timer 20a which can be independently set to control the time during which water is to flow.

For controlling operation of the control valve 31, a manually operable selector switch 45 is carried on the back guard 14. The selector switch 45 is mechanically connected to operate the electrical switch 41 and energize the solenoid coil 40 so that the armature of the solenoid is actuated against the biasing force of the spring 44 thereby moving the stopper 36 away from the communicating port 38. When the stopper is moved out of the port, water can flow through the main flow system from the respective mixer and time-length-flow control valves 17, 20, to the discharge flume 23. On the other hand, when the selector switch 41 is operated so as to deenergize the solenoid coil 40 the stopper 36 is permitted to close the port 38 and thereby prevent the flow of water to the discharge flume. In this state the system is ready to flow water to the convenience outlet 26.

Explaining the operation of the present invention, if it is desired to, for example, provide a source of warm water in a garage, if that is where the washer 10 is located, selection is made of the water temperature by using the mixing valve 18 (for details of a control circuit including structure for adjusting temperatures of water by using a mixing valve of the type herein illustrated, see co-pending application of Carl J. Knerr Ser. No. 371,245 filed June 1, 1964). The selector switch 45 is operated so as to energize solenoid 39 and block water flow to the discharge flume 23. The manually operable valve member 28 of the outlet 26 is turned to its open position and water is discharged by the auxiliary system 22 into the hose 30. Accordingly, an easily accessible and convenient source of warm water is provided in the environment of the washer.

The washer control system may be of the type including a timer controlled valve 20, for effecting time-fill of the washer or the like, or without such a time-fill control and instead having as added structure an adjustable timer, either of such timer controls permitting automatic control over the period of time water flows. The selector switch 45 is operated so as to block flow to the discharge flume 23 in the main flow system 17, and thereby force water to flow toward the convenience water outlet 26. Either of the timer arrangements would control the length of time which water would flow through the convenience water outlet; accordingly, the outlet could be used to sprinkle a lawn for a predetermined period of time and then automatically shut off.

In summarization it is clear that the present system is versatile in that it can be adapted to different types of home appliances which have a main water flow system.

Furthermore, the present inventive convenience water system can be used in appliances having either or both timed-length flow control devices and water temperature control devices, using any combination of these.

From the invention as described in connection with the preferred embodiment, it is understood that I do not intend to limit the invention to such embodiment. On the contrary, I intend to cover all alternatives, modifications, and equivalents as may be included within the spirit and scope of the invention as defined by the appended claims.

I claim:

1. In a home appliance having a cabinet such as an automatic washer or the like adapted to receive a supply of relatively hot and cold water as customarily provided at a household tap and having a main flow system for carrying the water, a control system for controlling the flow of the water in said flow system, the invention characterized by the combination comprising an auxiliary water flow system connected to said main water flow system so as to selectively receive water from the latter and capable of carrying substantially the same volume of water that is carried by the main water flow system, an outlet connected to said auxiliary water flow system adapted to permit coupling of liquid carrying means such as a hose, means associated with the cabinet for permitting selective access to said outlet while providing for concealment thereof when not in use, and a flow shut-off means operatively associated with said outlet for selectively blocking flow of water thereby permitting said main system to operate in a customary manner for effecting liquid flow for use in the home appliance.

2. In a home appliance having a cabinet such as an automatic washer or the like adapted to receive relatively hot and cold water as customarily provided at a household tap and having a main flow system for carrying the water, a control system for controlling the temperature of the water in said main flow system and for controlling the time-length of flow of the water in said main flow system, the invention characterized by the combination comprising an auxiliary water flow system connected to said main water flow system so as to receive water from the latter and capable of carrying substantially the same volume of water that is carried by the main water flow system, the temperature and time-length flow of the water being determined by said main flow system control, an outlet connected to said auxiliary water flow system adapted to permit coupling of liquid carrying means such as a hose, means associated with the cabinet for permitting selective access to said outlet while providing for concealment thereof when not in use, and a flow shut-off means operatively associated with said outlet for selectively blocking flow of liquid thereby permitting said main system to operate in a customary manner for effecting liquid flow for use in the appliance.

3. In a home appliance having a cabinet such as an automatic washer or the like adapted to receive relatively hot and cold water as customarily provided at a household tap and having a main flow system for carrying the water into a receptacle such as a tub or the like, a control system for controlling the temperature of the water in said main flow system and for controlling the time-length of flow of the water in said main flow system, a first valve in said main flow system for receiving and mixing said hot and cold water in selectable proportions to provide warm water, the invention characterized by the combination comprising a second valve in said main flow system operative between respective opened and closed positions to permit and block, respectively water flow into said receptacle, an auxiliary water flow system coupled to said main flow system between said first valve and said second valve for receiving water therefrom and capable of carrying substantially the same volume of water that is carried by the main flow system, a convenience outlet connected to said auxiliary water flow system adapted to permit coupling of liquid carrying means such as a hose, means associated with the cabinet for permitting selective access to said outlet while providing for concealment thereof when not in use, and a shut-off valve operatively associated with said outlet for selectively blocking flow of water thereby permitting said main system to operate in a customary manner for effecting liquid flow for use in the home appliance.

References Cited
UNITED STATES PATENTS

| | | | |
|---|---|---|---|
| 2,172,345 | 9/1939 | Bucknell | 137—597 X |
| 2,877,467 | 3/1959 | Cloud | 137—387 X |
| 3,168,109 | 2/1965 | Klingler | 137—597 |
| 3,237,635 | 3/1966 | Kozel | 137—597 X |
| 3,297,046 | 1/1967 | Hall | 137—597 X |

ALAN COHAN, *Primary Examiner.*